(12) United States Patent
Kaibara

(10) Patent No.: US 10,003,734 B2
(45) Date of Patent: Jun. 19, 2018

(54) IMAGE CAPTURING APPARATUS AND CONTROL METHOD OF IMAGE SENSOR

(71) Applicant: CANON KABUSHIKI KAISHA, Tokyo (JP)

(72) Inventor: Hiroshi Kaibara, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 15/165,216

(22) Filed: May 26, 2016

(65) Prior Publication Data

US 2016/0353005 A1    Dec. 1, 2016

(30) Foreign Application Priority Data

May 29, 2015 (JP) .................... 2015-110797

(51) Int. Cl.
| | |
|---|---|
| H04N 5/232 | (2006.01) |
| H04N 5/14 | (2006.01) |
| H04N 5/369 | (2011.01) |
| H04N 5/3745 | (2011.01) |

(52) U.S. Cl.
CPC ......... H04N 5/23212 (2013.01); H04N 5/144 (2013.01); H04N 5/3696 (2013.01); H04N 5/37457 (2013.01)

(58) Field of Classification Search
CPC .......... H04N 5/23212; H04N 5/37457; H04N 5/3696; H04N 5/144
See application file for complete search history.

(56) References Cited

U.S. PATENT DOCUMENTS

| | | | | |
|---|---|---|---|---|
| 2013/0335533 A1* | 12/2013 | Yamazaki | .......... | H04N 13/0225 348/49 |
| 2014/0327744 A1* | 11/2014 | Gotoh | ................ | H04N 13/0022 348/49 |

FOREIGN PATENT DOCUMENTS

| | | |
|---|---|---|
| JP | 2007-325139 A | 12/2007 |
| JP | 2012-155095 A | 8/2012 |

* cited by examiner

*Primary Examiner* — Mekonnen Dagnew
(74) *Attorney, Agent, or Firm* — Cowan, Liebowitz & Latman, P.C.

(57) ABSTRACT

An image capturing apparatus comprising: an image sensor that has a plurality of photoelectric conversion portions corresponding to each of a plurality of microlenses arranged in two-dimensions, and outputs an image signal corresponding to a quantity of incident light; a detection unit configured to detect a moving direction of a subject; a determination unit configured to, in a case where the subject is moving in a main scanning direction, determine to perform divided readout in every predetermined number of rows, and to perform added readout in the rows except for the every predetermined number of rows; and a control unit configured to control the image sensor by switching between the divided readout and the added readout in units of rows based on the determination result.

4 Claims, 11 Drawing Sheets

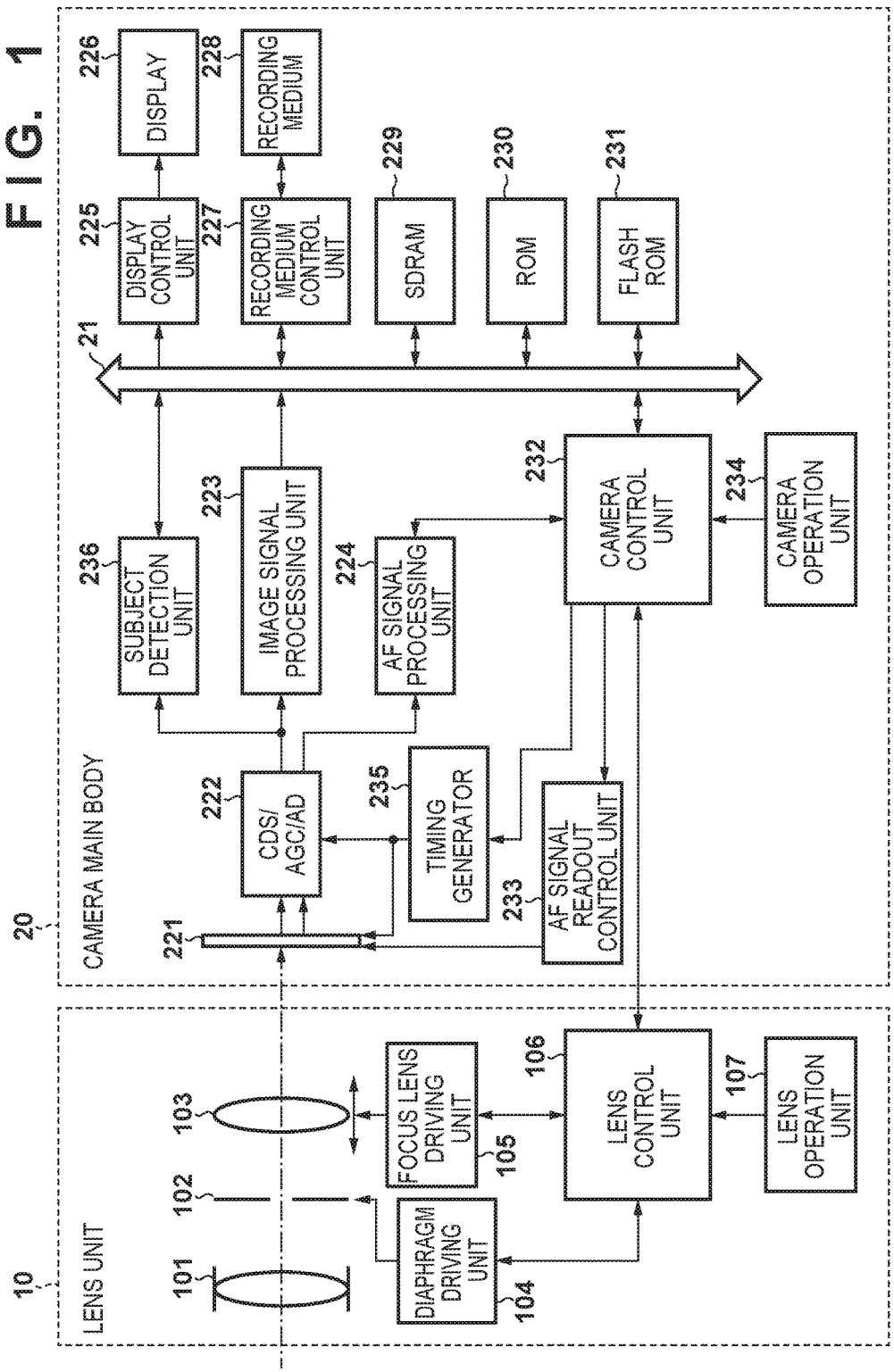

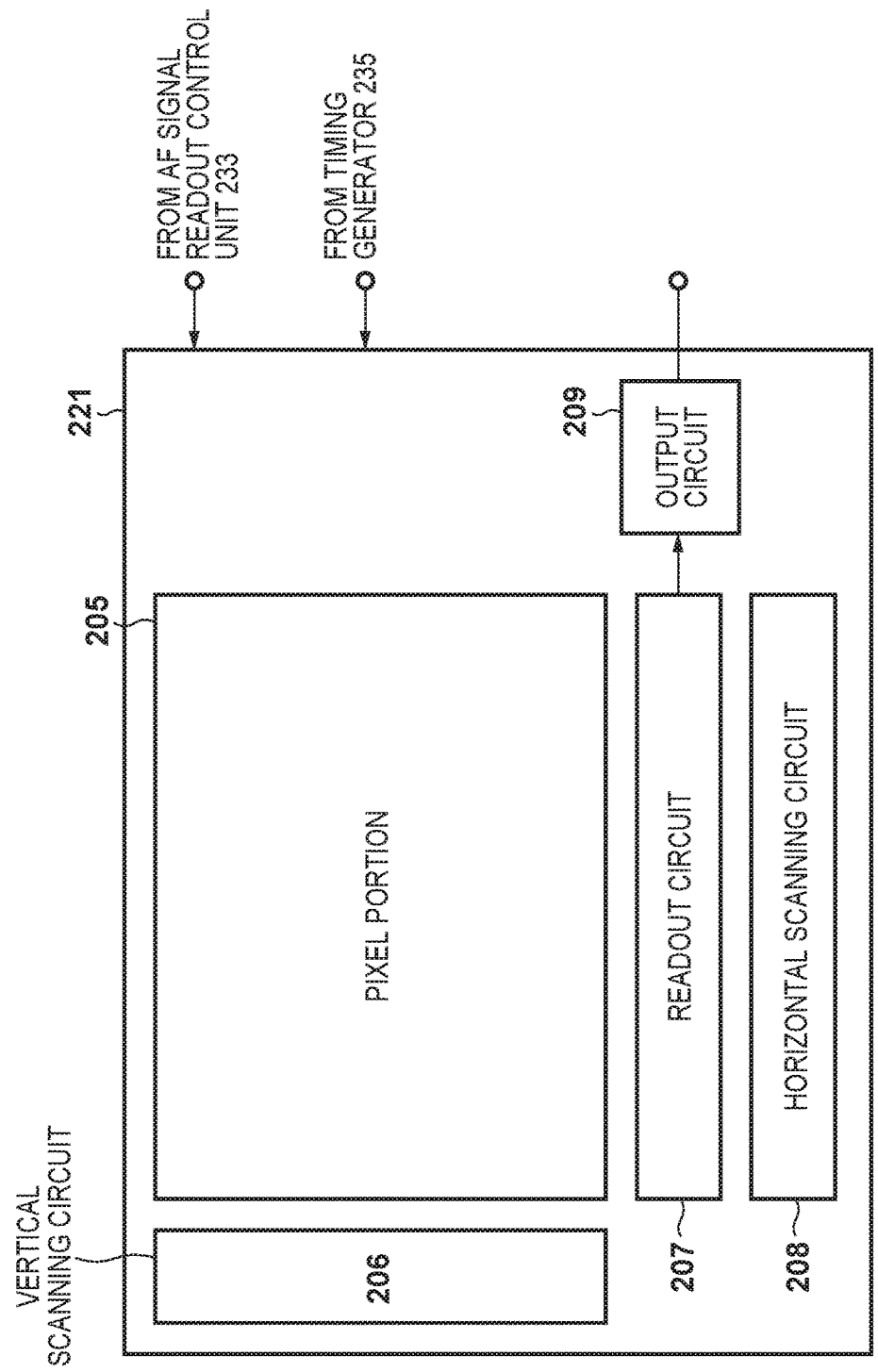

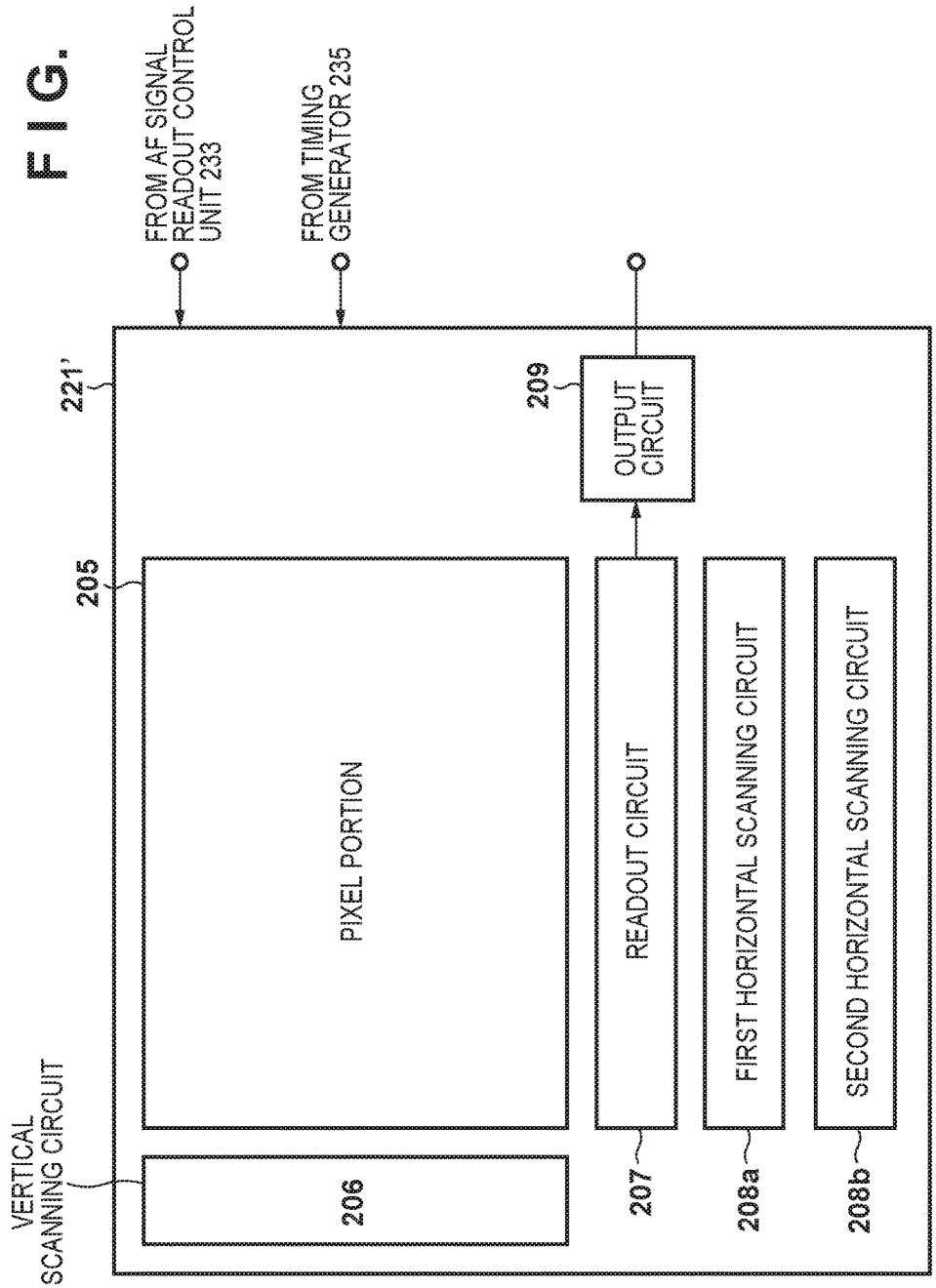

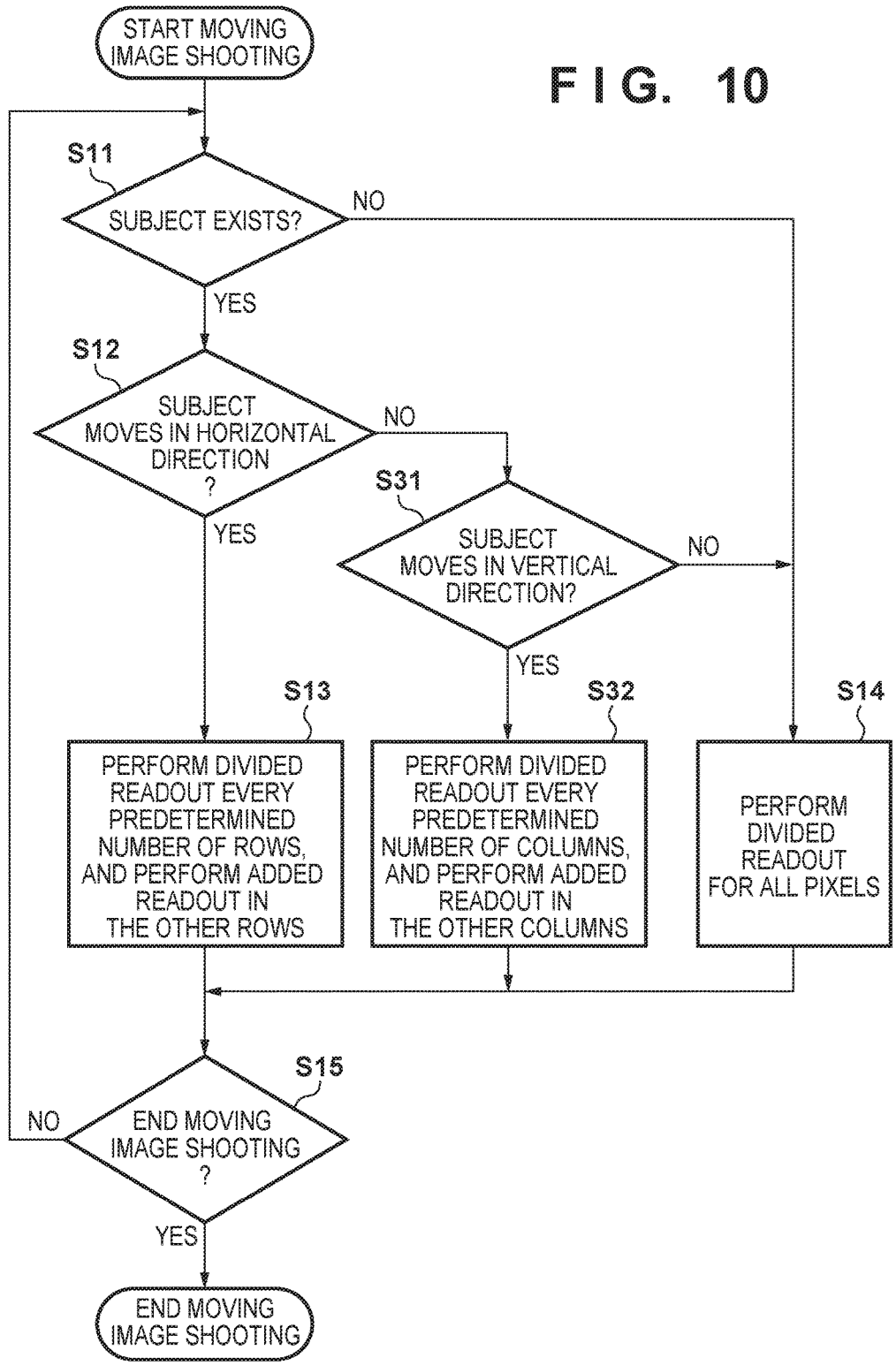

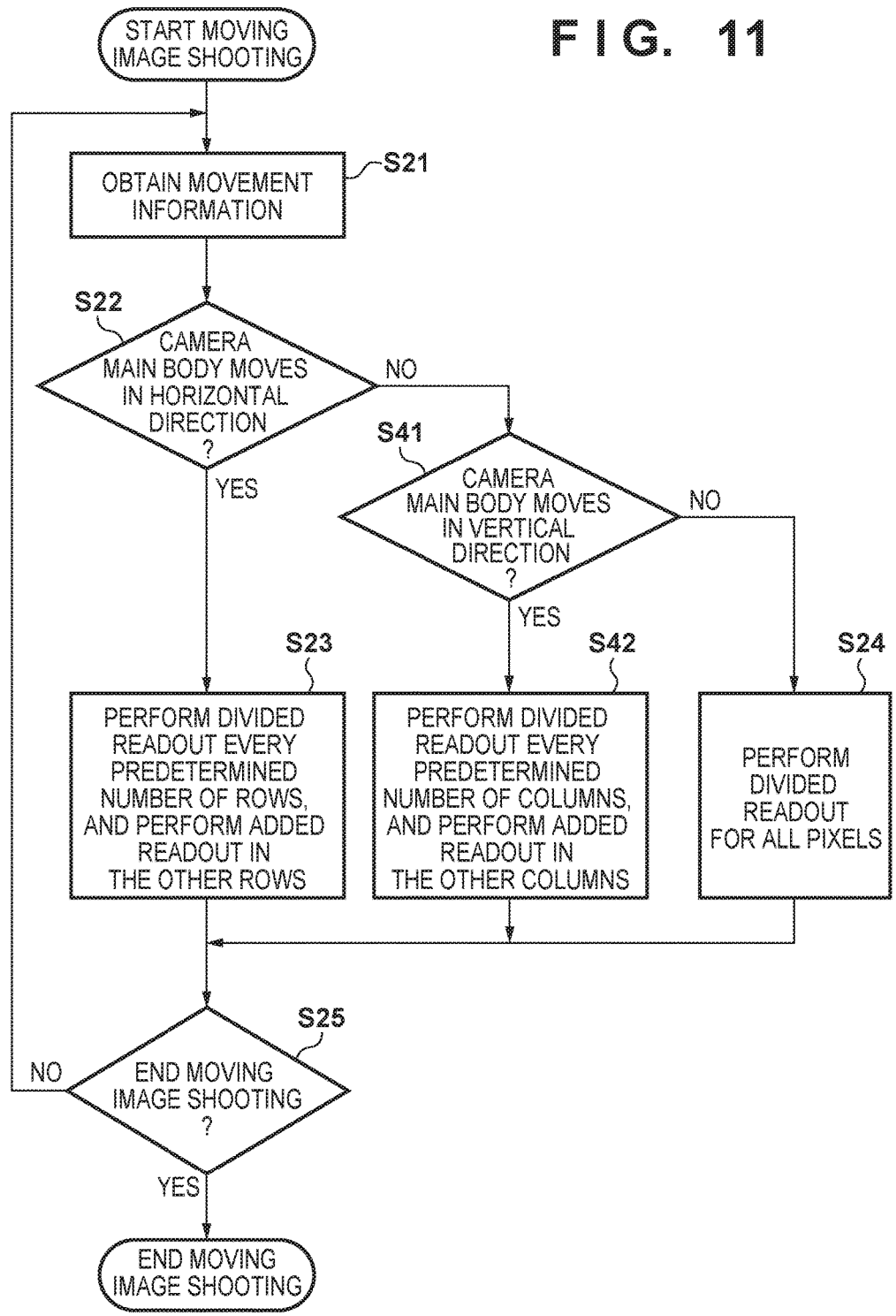

IMAGE CAPTURING APPARATUS AND CONTROL METHOD OF IMAGE SENSOR

BACKGROUND OF THE INVENTION

Field of the Invention

The present invention relates to an image capturing apparatus and a control method of an image sensor capable of reading out from each pixel a pair of signals corresponding to light beams that have passed through different pupil regions of an optical system.

Description of the Related Art

Conventionally, a technique for realizing focus detection function and an image signal acquisition using one image sensor has been known, and as an example, an image sensor capable of using pixels for acquiring information for focus detection as pixels for acquiring an image for display/record has been proposed (see Japanese Patent Laid-Open No. 2007-325139). According to this technique, among pixels that form an image sensor, each of at least part of the pixels is divided into a plurality of regions in the horizontal and/or vertical direction, and upon acquiring an image, an image signal is obtained by adding signals obtained from the divided regions. Further, upon performing focus control, the divided regions are read out so that signals of two regions of each pixel that is pupil-divided in the horizontal or vertical direction are obtained, and the obtained signals can be used for focus detection of phase difference method.

Further, Japanese Patent Laid-Open No. 2012-155095 proposes an image capturing apparatus capable of changing between a control of outputting signals of divided areas as an image signal by adding the signals by pixel, and a control of outputting the signals of the divided areas independently so as to be used as focus control signals for phase difference method.

On the other hand, as the number of pixels in an image sensor increases, it is necessary to readout larger number of pixels than ever within a predetermined period of time, which causes an increase in system load due to an increase in output rate of the image sensor or an increase in the number of output channels. For example, there is a problem in which, if the number of output channels increases, or if the output rate increases with the number of channels being unchanged, adjustment of signal delay amount between the channels becomes more complicated. Especially, in a case of image sensor having pupil division readout function, in which each pixel is configured with a plurality of photoelectric conversion portions, the number of signals to be read out increases, and the load of system further increases. Further, a problem arises such that energy consumption increases by reading a larger number of signals.

According to Japanese Patent Laid-Open No. 2012-155095, in a focus control area, a signal read out from each of the photoelectric conversion portions is output as-is from the image sensor, and in other areas, signals read out from the photoelectric conversion portions are added by pixel and output from the image sensor. By using different output methods in the focus control area and in the other areas, the number of signals to be output is reduced. However, in Japanese Patent Laid-Open No. 2012-155095, since a signal is independently read out from each of the photoelectric conversion portions, the period of time required for reading out signals cannot be sufficiently shortened.

Further, according to Japanese Patent Laid-Open No. 2012-155095, the focus control region is set to an object region, and a way of outputting the signal for focus control and a way of outputting a signal for image are changed. In this case, there is a problem in which, when a subject is moving, it is difficult to perform focus control while sufficiently tracking the moving subject. The accuracy of performing focus detection while tracing a moving subject improves as the number of regions from which signals are read out without being added increases, but the problems regarding the increase in system load and the increase in power consumption cannot be solved. Therefore, a problem that from which area in a frame a focus control signal of phase difference method is to be read out is posed.

SUMMARY OF THE INVENTION

The present invention has been made in consideration of the above situation, and to reduce a system load and energy consumption without degrading accuracy of focus detection.

According to the present invention, provided is an image capturing apparatus comprising: an image sensor that has a plurality of photoelectric conversion portions corresponding to each of a plurality of microlenses arranged in two-dimensions, and outputs an image signal corresponding to a quantity of incident light; a detection unit configured to detect a moving direction of a subject based on the image signal; a determination unit configured to, in a case where the moving direction of the subject detected by the detection unit is a main scanning direction, determine to perform first readout in which a pair of signals having parallax and an added signal of the plurality of photoelectric conversion portions are obtained from the photoelectric conversion portions corresponding to each microlens in every predetermined number of rows, and to perform second readout in which an added signal of the plurality of photoelectric conversion portions is obtained from the photoelectric conversion portions corresponding to each microlens without obtaining a pair of signals in the rows except for the every predetermined number of rows; and a control unit configured to control the image sensor by switching between the first readout and the second readout in units of rows based on a determination result of the determination unit.

Further, according to the present invention, provided is an image capturing apparatus comprising: an image sensor that has a plurality of photoelectric conversion portions corresponding to each of a plurality of microlenses arranged in two-dimensions, and outputs an image signal corresponding to a quantity of incident light; a detection unit configured to detect a moving direction of an image capturing apparatus; a determination unit configured to, in a case where the moving direction of the image capturing apparatus detected by the detection unit is a main scanning direction, determine to perform first readout in which a pair of signals having parallax and an added signal of the plurality of photoelectric conversion portions are obtained from the photoelectric conversion portions corresponding to each microlens in every predetermined number of rows, and to perform second readout in which an added signal of the plurality of photoelectric conversion portions is obtained from the photoelectric conversion portions corresponding to each microlens without obtaining a pair of signals in the rows except for the every predetermined number of rows; and a control unit configured to control the image sensor by switching between the first readout and the second readout in units of rows based on a result of the determination of the determination unit.

Furthermore, according to the present invention, provided is a control method of an image sensor that has a plurality of photoelectric conversion portions corresponding to each of a plurality of microlenses arranged in two-dimensions, and outputs an image signal corresponding to a quantity of incident light, the method comprising: detecting a moving direction of a subject based on the image signal; determining, in a case where the detected moving direction of the subject is a main scanning direction, to perform first readout in which a pair of signals having parallax and an added signal of the plurality of photoelectric conversion portions are obtained from the photoelectric conversion portions corresponding to each microlens in every predetermined number of rows, and to perform second readout in which an added signal of the plurality of photoelectric conversion portions is obtained from the photoelectric conversion portions corresponding to each microlens without obtaining a pair of signals in the rows except for the every predetermined number of rows; and controlling the image sensor by switching between the first readout and the second readout in units of rows based on a result of the determination.

Further, according to the present invention, provided is a control method of an image sensor that has a plurality of photoelectric conversion portions corresponding to each of a plurality of microlenses arranged in two-dimensions, and outputs an image signal corresponding to a quantity of incident light, the method comprising: detecting a moving direction of an image capturing apparatus; determining, in a case where the detected moving direction of the image capturing apparatus is a main scanning direction, to perform first readout in which a pair of signals having parallax and an added signal of the plurality of photoelectric conversion portions are obtained from the photoelectric conversion portions corresponding to each microlens in every predetermined number of rows, and to perform second readout in which an added signal of the plurality of photoelectric conversion portions is obtained from the photoelectric conversion portions corresponding to each microlens without obtaining a pair of signals in the rows except for the every predetermined number of rows; and controlling the image sensor by switching between the first readout and the second readout in units of rows based on a result of the determination.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram showing a schematic configuration of an image capturing system according to first and third embodiments of the present invention;

FIG. 2 is a diagram showing a schematic structure of an image sensor according to first and second embodiments;

FIG. 9 is a diagram showing a schematic structure of an image sensor according to the third and fourth embodiments;

FIG. 10 is a flowchart of a driving method of the image sensor according to the third embodiment; and FIG. 11 is a flowchart of a driving method of the image sensor according to the fourth embodiment.

DESCRIPTION OF THE EMBODIMENTS

Figure 3A:
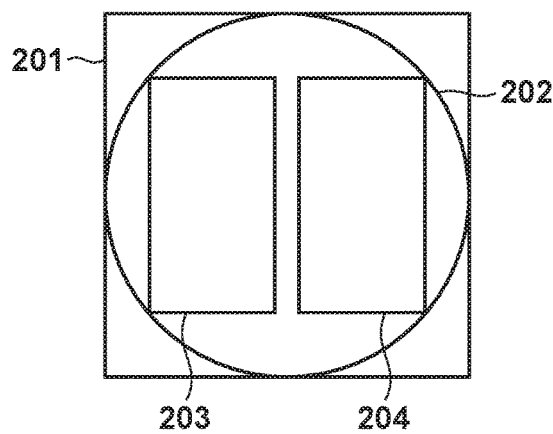
FIGS. 3A and 3B are a conceptual view and a circuit diagram illustrating an example of the structure of a pixel of the image sensor according to the embodiments.

Exemplary embodiments of the present invention will be described in detail in accordance with the accompanying drawings.

First Embodiment

Configuration of Image Capturing System

FIG. 1 is a block diagram showing a schematic configuration of an image capturing system according to a first embodiment of the present invention. In the first embodiment, a lens-exchangeable image capturing system is explained as an example, however, the present invention can be applied to an image capturing system with a fixed lens unit.

As shown in FIG. 1, the image capturing system of the first embodiment is formed from a lens unit 10 and a camera main body 20. A lens control unit 106 for controlling overall operation of the lens unit 10 and a camera control unit 232 for controlling overall operation of the image capturing system including the lens unit 10 communicates data with each other via a terminal provided on a lens mount.

First, a structure of the lens unit 10 will be explained. The lens unit 10 includes an imaging optical system formed from a fixed lens 101, a diaphragm 102, a focus lens 103, and so forth. The diaphragm 102 is driven by a diaphragm driving unit 104, and adjusts an amount of light which will be incident on an image sensor 221 (explained later). The focus lens 103 is driven by a focus lens driving unit 105, and used for focus control. Note that focus control may be realized by configuring the image sensor 221 such that the image sensor 221 is moved along the optical axis. The diaphragm driving unit 104 and the focus lens driving unit 105 are driven by the lens control unit 106, and an aperture diameter of the diaphragm 102 and the position of the focus lens 103 are controlled.

In a case where a user operates a focus ling or the like provided on a lens operation unit 107 to control focus or the like, the lens control unit 106 performs control in response to the user operation. Further, the lens operation unit 107 allows a user to perform settings with regard to the operation of the lens unit 10, such as changeover between autofocus (AF)/manual focus (MF) modes, setting of an image shooting distance range, and setting of image stabilization mode.

The lens control unit 106 controls the diaphragm driving unit 104 and the focus lens driving unit 105 in accordance with control commands and control information received from the camera control unit 232 as will be explained later, and also transmits lens information to the camera control unit 232.

Next, a configuration of the camera main body 20 will be explained. In the camera main body 20, the image sensor 221 is formed with CCD, CMOS sensor, or the like, and light flux that has passed the imaging optical system of the lens unit 10 is formed on a light-receiving surface of the image sensor 221. Then, a formed image of a subject is photoelectrically converted to charge in response to an amount of incident light by photodiodes (photoelectric conversion portions) of the image sensor 221, and the charge is accumulated. The charge accumulated in each photodiode is sequentially readout from the image sensor 221 as a voltage signal corresponding to the charge based on a driving pulse provided from a timing generator 235 in accordance with instructions from the camera control unit 232. It should be noted that the image sensor 221 of the first embodiment, whose configuration will be explained later in detail, is capable of outputting a pair of signals for autofocus (referred to as "AF signal", hereinafter) that has a parallax and can be used for phase difference focus detection in addition to a normal image signal (for recording/display).

The image signal and the AF signal read out from the image sensor 221 are input to a CDS/AGC/AD circuit 222, where a correlated double sampling for removing reset noise, gain adjustment, and digitization of the signal are performed. Then, the CDS/AGC/AD circuit 222 outputs the processed image signal to an image signal processing unit 223 and a subject detection unit 236, and outputs the AF signal to an AF signal processing unit 224.

The image signal processing unit 223 performs various image processes on the image signal output from the CDS/AGC/AD circuit 222 and generates image data, and stores it in an SDRAM 229 via a bus 21. The image data stored in the SDRAM 229 is read out by a display control unit 225 via the bus 21, and displayed on a display 226. Further, in an operation mode for recording the image signal, the image data stored in the SDRAM 229 is recorded on a recording medium 228 by a recording medium control unit 227.

A ROM 230 stores a control program executed by the camera control unit 232 and various data and so on necessary for the control, and a flash ROM 231 stores various setting information, such as user setting information, and so on with regard to operation of the camera main body 20.

The AF signal processing unit 224 sets and arranges a focus detection area in an imaging screen on the basis of information from the camera control unit 232. Then, the AF signal processing unit 224 performs known correlation operation based on a pair of AF signals included in the set focus detection area among a pair of AF signals output from the CDS/AGC/AD circuit 222, to calculate an image offset amount and reliability information. The reliability information includes, for example, coincidence of two images, sharpness of two images, contrast information, saturation information, defect information, and so forth. Then, the AF signal processing unit 224 outputs the calculated image offset amount and the reliability information to the camera control unit 232.

The camera control unit 232 is comprised of, for example, one or more programmable processors, and realizes overall operations of the camera system including the lens unit 10 by executing the control program stored in the ROM 230, for example. First, the camera control unit 232 exchanges information with each unit of the camera main body 20 and control it. Further, in addition to the processing within the camera main body 20, the camera control unit 232 also performs various functions corresponding to a user operation, such as power ON/OFF control, changes in settings, recording control, changeover between auto focus (AF)/manual focus (MF), confirmation of an image to be recorded, designation of focus detection area, and so forth, in response to an input from a camera operation unit 234 operated by the user. Further, camera control unit 232 exchanges information with the lens control unit 106 in the lens unit 10 as described above, and transmits the control commands and control information for the imaging optical system and receives information of the lens unit 10. As one of such controls, the camera control unit 232 drives the focus lens 103 via the lens control unit 106 on the basis of a result of the correlation operation obtained from the AF signal processing unit 224.

The subject detection unit 236 performs a known detection processing on the image signal output from the CDS/AGC/AD circuit 222, and specifies whether or not a subject exists. If a subject exists, the subject detection unit 236 determines a subject area based on coordinates of the position of the subject, and transmits the result to the camera control unit 232. The camera control unit 232 uses the subject area to set a position for AF and a position for AE, for example. Then, in accordance with the subject detected by the subject detection unit 236, the camera control unit 232 determines and controls a row of the image sensor 221 from which AF signal is to be read as will be described later. Note that, in a case where a user designates the focus detection area via the camera operation unit 234, the subject detection unit 236 detects a subject that exists at a position of the designated focus detection area.

Further, the coordinates of the position where the subject exists are stored in the SDRAM 229, and by using the coordinates when detecting the subject area next and subsequent times, it is possible to narrow an area in which subject detection processing is to be performed. Then at the time of specifying the subject area, whenever the coordinates of the position where the subject exists is updated, the position coordinates to be stored in the SDRAM 229 is also updated.

The camera control unit 232 provides control information of the camera main body 20 and information necessary for setting of a region for generating the AF signal, such states of the lens unit 10 to an AF signal readout control unit 233. The AF signal readout control unit 233 sets in the image sensor 221 a region from which the AF signal is to be read out using the information obtained from the camera control unit 232.

Configuration of Image Sensor

Next, the configuration of the image sensor 221 according to the first embodiment will be explained with reference to FIGS. 2, 3A and 3B. The image sensor 221 in the first embodiment is a CMOS image sensor, for example, which adapts XY address type scanning scheme.

FIG. 2 is a diagram showing a schematic structure of the image sensor 221 according to the first embodiment. As shown in FIG. 2, the image sensor 221 has a pixel portion 205 in which a plurality of pixels are arranged in two dimensions, a vertical scanning circuit 206, a readout circuit 207, a horizontal scanning circuit 208, and an output circuit 209. The pixel portion 205 is covered with a color filter of a plurality of colors, and in this embodiment, a Bayer color filter in which mosaic filters of R (red), G (green), and B (blue) are arranged in two dimensions is used.

The vertical scanning circuit 206 selects and drives an arbitrary row of pixels in the pixel portion 205 based on control signals from the AF signal readout control unit 233 and the timing generator 235. The readout circuit 207 reads out a signal output from the pixels in the row selected by the vertical scanning circuit 206, and transmits the read-out signal to the output circuit 209 under control of the horizontal scanning circuit 208. In this manner, scanning in the main scanning direction (horizontal direction) is performed. Further, as the vertical scanning circuit 206 shifts the selected row of pixels in the sub-scanning direction (vertical direction), a signal can be read out from the entire area of the pixel portion 205. The read-out signal is output outside of the image sensor 221 via the output circuit 209.

Figure 3B:
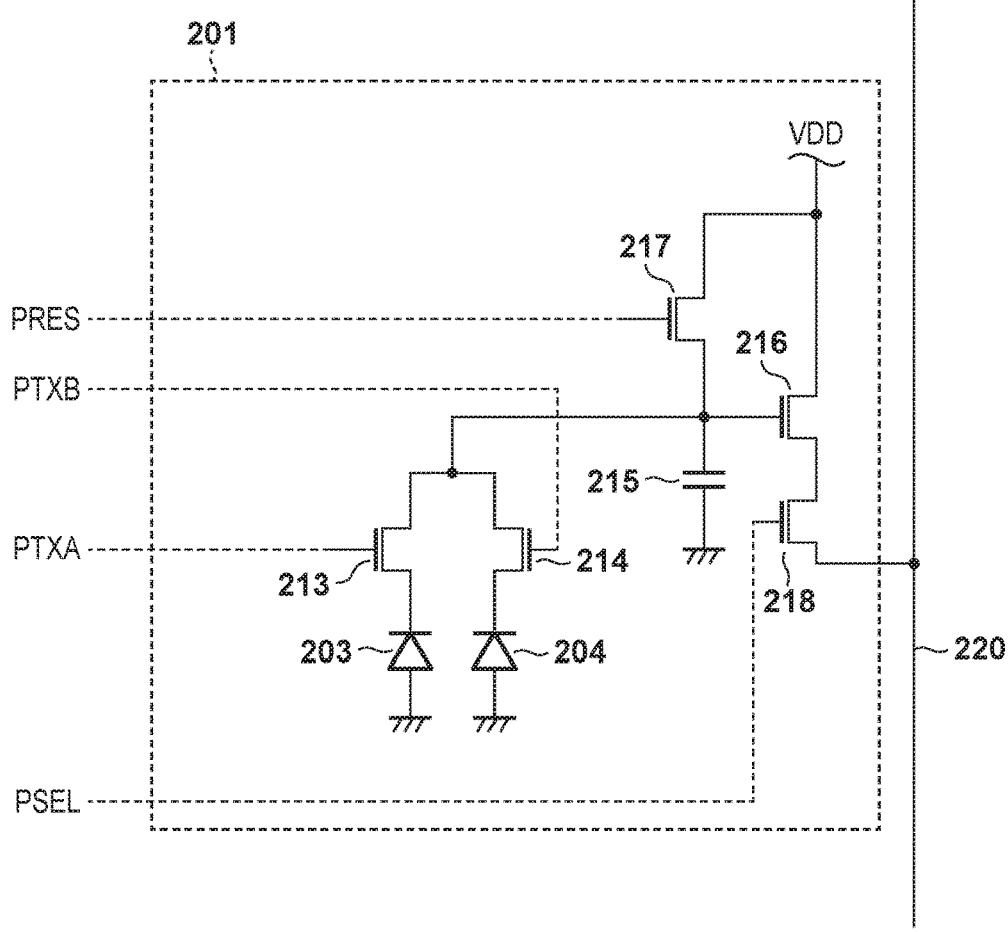

FIG. 3A is a conceptual view illustrating an example of the structure of a pixel forming the pixel portion 205, and FIG. 3B is a circuit diagram of the structure of the pixel 201. As shown in FIG. 3A, the pixel 201 has one microlens 202, and two photodiodes, namely a first photodiode (PD) 203 and a second photodiode (PD) 204. The first PD 203 and the second PD 204 are photoelectric conversion portions which receive light that has passed through the same microlens 202, and generate signal charge corresponding to the received amount of light. Further, as shown in FIG. 3B, a first transfer switch 213 and a second transfer switch 214 that are controlled by transfer pulse signals PTXA and PTXB, respectively, from the vertical scanning circuit 206 are connected to the first PD 203 and the second PD 204, respectively. When in an ON state, the first transfer switch 213 and the second transfer switch 214 transfer charge generated in the first PD 203 and the second PD 204 to a common floating diffusion region (FD) 215, respectively.

The FD 215 temporally stores the charge transferred from the first PD 203 and the second PD 204 and also functions as charge-voltage converter that converts the stored charge to a voltage signal. An amplifier 216 is a source follower MOS transistor, and amplifies the voltage signal based on the charge stored in the FD 215 and outputs the amplified voltage signal as a pixel signal. A selection switch 218 is controlled by a control signal PSEL from the vertical scanning circuit 206, and, when selected, outputs the pixel signal amplified by the amplifier 216 to a vertical output line 220.

A reset switch 217 is controlled by a reset pulse signal PRES from the vertical scanning circuit 206, and resets the potential of the FD 215 to a reference potential VDD. Further, by simultaneously turning on the reset switch 217, the first transfer switch 213, and the second transfer switch 214, it is possible to reset the potentials of the first PD 203 and second PD 204 to the reference potential VDD.

In the pixel 201 having the above configuration, in order to read out only a signal for recording/display (A+B signal), first, both the first transfer switch 213 and second transfer switch 214 are turned on. Then, charge generated in the first PD 203 and the second PD 204 are transferred to the FD 215 and read out. By performing the foregoing control while the selection switch 218 is on by the control signal PSEL, it is possible to obtain the signal for recording/display (A+B signal). This readout method is referred to as "added readout", hereinafter.

On the other hand, in order to obtain a pair of AF signals for AF by a phase difference detection method, the following readout control is performed. First, by turning on the first transfer switch 213 or the second transfer switch 214 by the transfer pulse signal PTXA or PTXB, charge generated in the first PD 203 or the second PD 204 is transferred to the FD 215. Then, by reading out the charge while the selection switch 218 is ON by the control signal PSEL, one of the pair of AF signals (A signal) is obtained. Next, by simultaneously turning on the first transfer switch 213 and the second transfer switch 214, charge generated in the first PD 203 and the second PD 204 is transferred to the FD 215. Then, by reading out the charge while the selection switch 218 is ON by the control signal PSEL, it is possible to obtain the signal for recording/display (A+B signal). Thereafter, by subtracting one of the pair of AF signals (A signal), which was read in advance, from the signal for recording/display (A+B signal), the other of the pair of AF signals (B signal) can be obtained. Note that the signal for recording/display (A+B signal) may be obtained by reading out a pair of AF signals (A signal and B signal) separately and adding them. The above readout method is referred to as "divided readout", hereinafter.

By calculating a phase difference between the pair of AF signals obtained from the pixel 201 having the above configuration in the AF signal processing unit 224, focus detection by the phase difference detection method can be performed.

Figure 4:
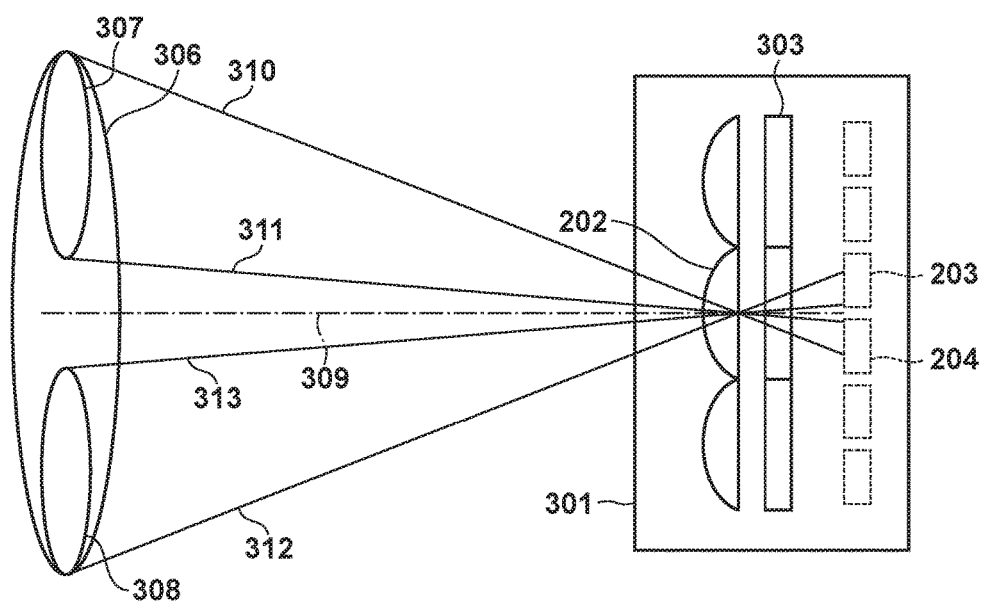
FIG. 4 is a diagram for explaining a relationship between pupil regions of an imaging optical system and pixels.

Next, the relationship between a pupil region of the imaging optical system and the first PD 203 and the second PD 204 of the pixel 201 of the image sensor 221 will be explained with reference to FIG. 4. FIG. 4 shows a state in which a light flux that has passed through an exit pupil 306 of the imaging optical system is incident on the image sensor 221. Note that the same reference numerals indicates the same structures shown in FIGS. 3A and 3B. Reference numeral 301 shows a cross sectional view of part of pixels configuring the image sensor 221, and, in each pixel 201, a color filter 303 is provided between the microlens 202 and the first and second PDs 203 and 204.

Further, in FIG. 4, the center of the light flux that passes through the exit pupil 306 and is incident on the pixel 201 having the microlens 202 is defined as an optical axis 309. The light flux that has passed through the exit pupil 306 is incident on the image sensor 221 with the optical axis 309 as its center. Reference numerals 307 and 308 indicates regions (pupil regions) that differ from each other in the exit pupil 306 of the imaging optical system. Further, reference numeral 310 and 311 indicate the outermost light beam of the light flux that has passed through the pupil region 307, and reference numeral 312 and 313 indicate the outermost light beam of the light flux that has passed through the pupil region 308. As shown FIG. 4, among the light flux that has passed through the exit pupil 306, the light flux that has passed through the pupil region 307 above the optical axis 309 is incident on the second PD 204, and the light flux that has passed through the pupil region 308 below the optical axis 309 is incident on the first PD 203. Thus, the first PD 203 and the second PD 204 receive a pair of light fluxes that have passed through different pupil regions from each other, namely, a pair of subject images formed by the pair of light fluxes.

Note that, in FIGS. 2 to 4, a pixel structure in which two diodes are formed with respect to one microlens 202, however, the present invention is not limited to this. For example, three or more photoelectric conversion portions may be provided with respect to one microlens. Thus, an image sensor having a plurality of pixels, arranged in two dimensions, each of which can receives light fluxes that pass through pupil regions different from each other may be used.

Driving Method of the Image Sensor

Figure 5A:
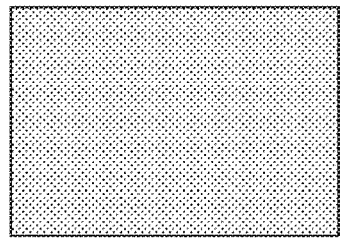
FIGS. 5A to 5E are diagrams for explaining a driving method of the image sensor according to the first and third embodiments.
Figure 5B:
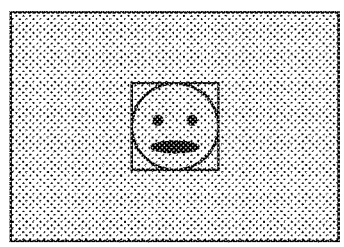
Figure 5C:
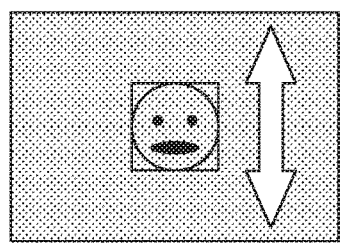
Figure 5D:
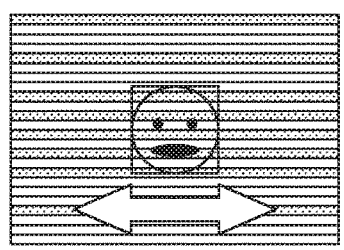
Figure 6:
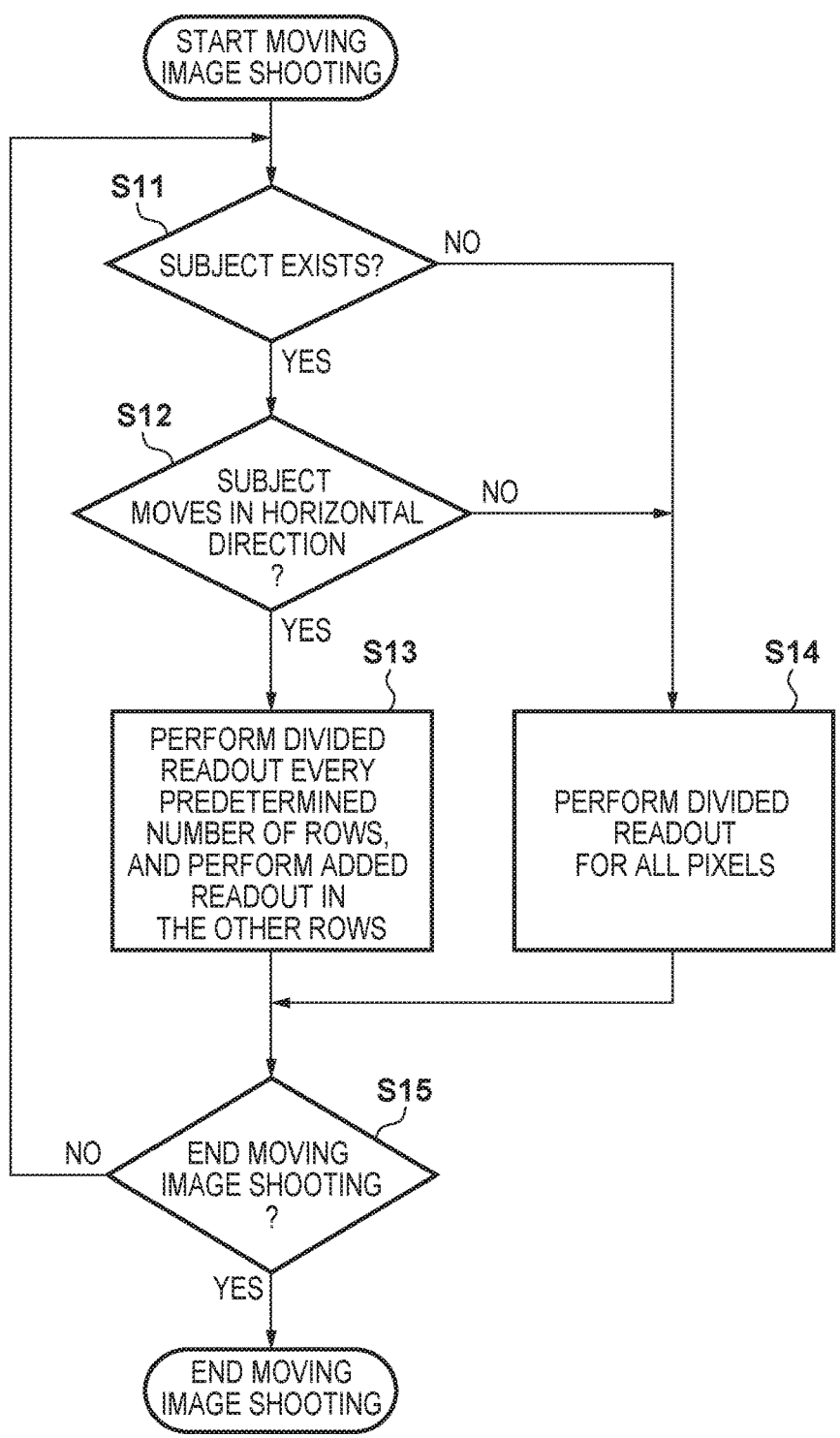
FIG. 6 is a flowchart of a driving method of the image sensor according to the first embodiment.

Next, a driving method of the image sensor 221 according to the first embodiment will be explained with reference to FIGS. 5A to 5D and FIG. 6. FIGS. 5A to 5D are conceptual view illustrating respective drive states, which will be explained later, according to the first embodiment, and FIG. 6 is a flowchart of the driving method of the image sensor 221 according to the first embodiment. The driving method in the first embodiment may be used especially during moving image shooting and while using electronic view finder in an image capturing apparatus.

When the moving image shooting is started, first in step S11, it is determined whether or not a subject is detected in the subject detection unit 236. If no subject is detected, the process proceeds to step S14 where the camera control unit 232 notifies the AF signal readout control unit 233 that no subject is detected. The AF signal readout control unit 233 controls the image sensor 221 to perform the divided readout for all the pixels. In this manner, a signal for recording/display and a pair of AF signals are readout. FIG. 5A shows a state where no subject is detected.

In a case where a subject is detected, the process proceeds to step S12, where whether or not the subject is moving in the horizontal direction is determined by comparing in the camera control unit 232 the position of the detected subject with the position/positions of a subject/subjects which have been detected. If it is determined in step S12 that the subject is not moving in the horizontal direction, the process proceeds to step S14 where the camera control unit 232 notifies the AF signal readout control unit 233 that the subject is not moving in the horizontal direction. In response to this, the AF signal readout control unit 233 controls the image sensor 221 so that the divided readout is performed for all pixels. In this case as well, a signal for recording/display and a pair of AF signals are readout from all the pixels. FIG. 5B shows a case where the subject is detected but its moving direction is not determined because there is no past data of the subject, for example, and FIG. 5C shows a case where the subject is moving in the vertical direction.

On the other hand, if it is determined in step S12 that the subject is moving in the horizontal direction, the camera control unit 232 notifies the AF signal readout control unit 233 that the subject is moving in the horizontal direction in step S13. The AF signal readout control unit 233 controls the image sensor 221 such that the divided readout is performed every predetermined number of rows, and the added readout is performed in the other rows. In that case, the area where the subject exists is read out by the divided readout more densely than an area where the subject does not exist. In this manner, while a signal for recording/display is read out from all the pixels, a pair of AF signals are read out every predetermined number of rows. FIG. 5D shows an example of readout control in a case where the subject moves in the horizontal direction.

After step S13 or S14, it is determined in step S15 whether or not the moving image shooting is ended, and if not, the process returns to step S11 and the above described processes are repeated. In a case of ending the moving image shooting (YES in step S15), the processing is ended.

According to the first embodiment as described above, in a case where a subject is moving in the horizontal direction, by reducing the number of rows in which the divided readout is performed, it is possible to reduce the number of pixels to be read out by the divided readout without degrading an accuracy of focus detection. By virtue of this, it is possible to reduce the system load and the power consumption.

Second Embodiment

Next, a description will be given of a second embodiment of the present invention. In the first embodiment as described above, it is explained that, in a case where the subject in a shot image is moving in the horizontal direction, the divided readout is performed every predetermined number of rows. By contrast, in the second embodiment, in a case where an image capturing system moves in the horizontal direction, it is controlled such that the divided readout is performed every predetermined number of rows.

Figure 7:
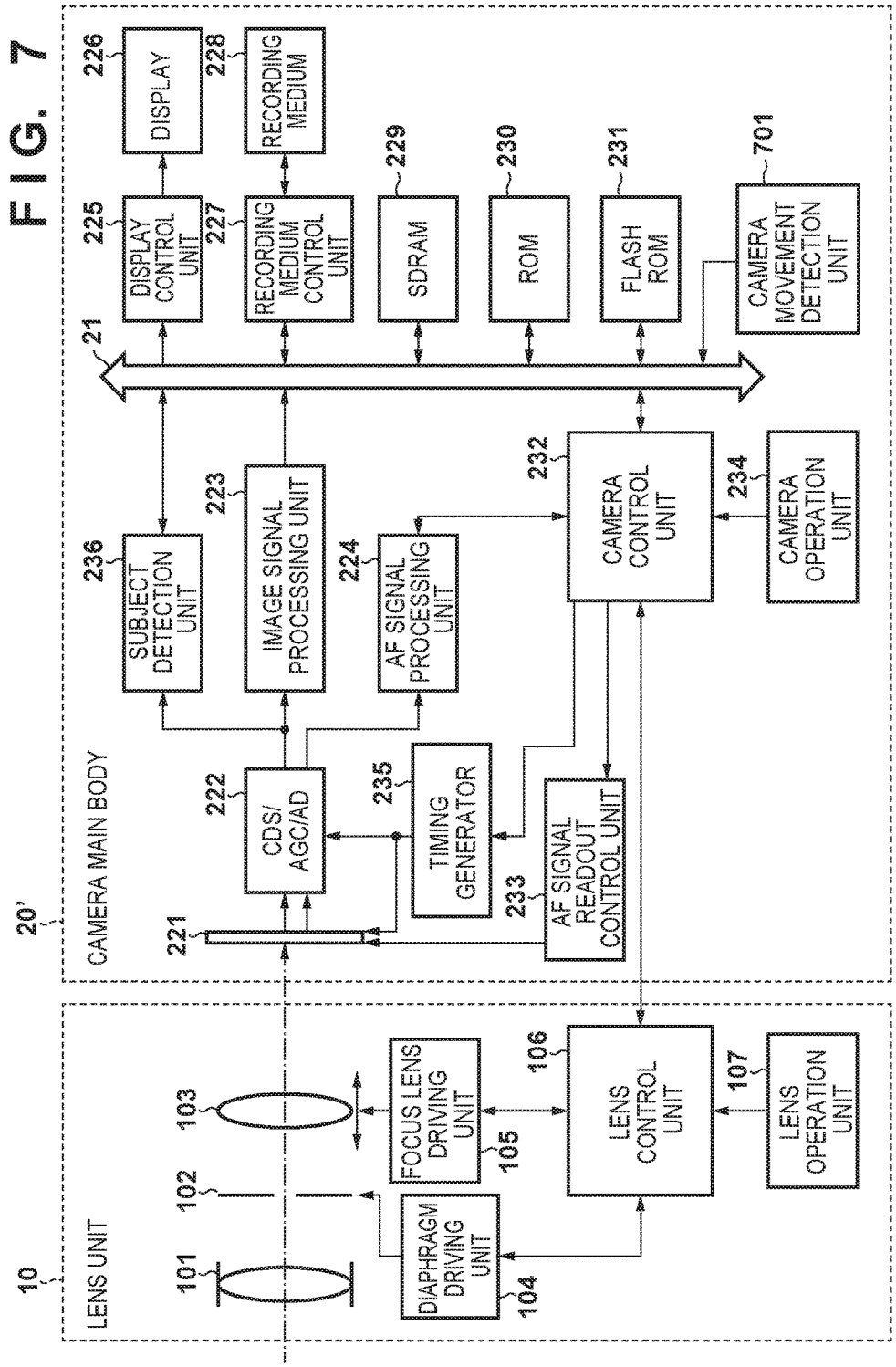
FIG. 7 is a block diagram of a schematic configuration of an image capturing system according to second and fourth embodiments.

FIG. 7 is a block diagram of a schematic configuration of an image capturing system according to the second embodiment. FIG. 7 differs from FIG. 1 in the point that a camera main body 20' further has a camera movement detection unit 701. Other constituents are the same as those described in the first embodiment, the same reference numerals are used, and an explanation of them are omitted.

The camera movement detection unit 701 is formed from, for example, a known gyro sensor or the like, and detects the movement of the camera main body 20' and outputs movement information to the camera control unit 232. The camera control unit 232 detects the moving direction of the camera based on the movement information obtained from the camera movement detection unit 701.

Figure 8:
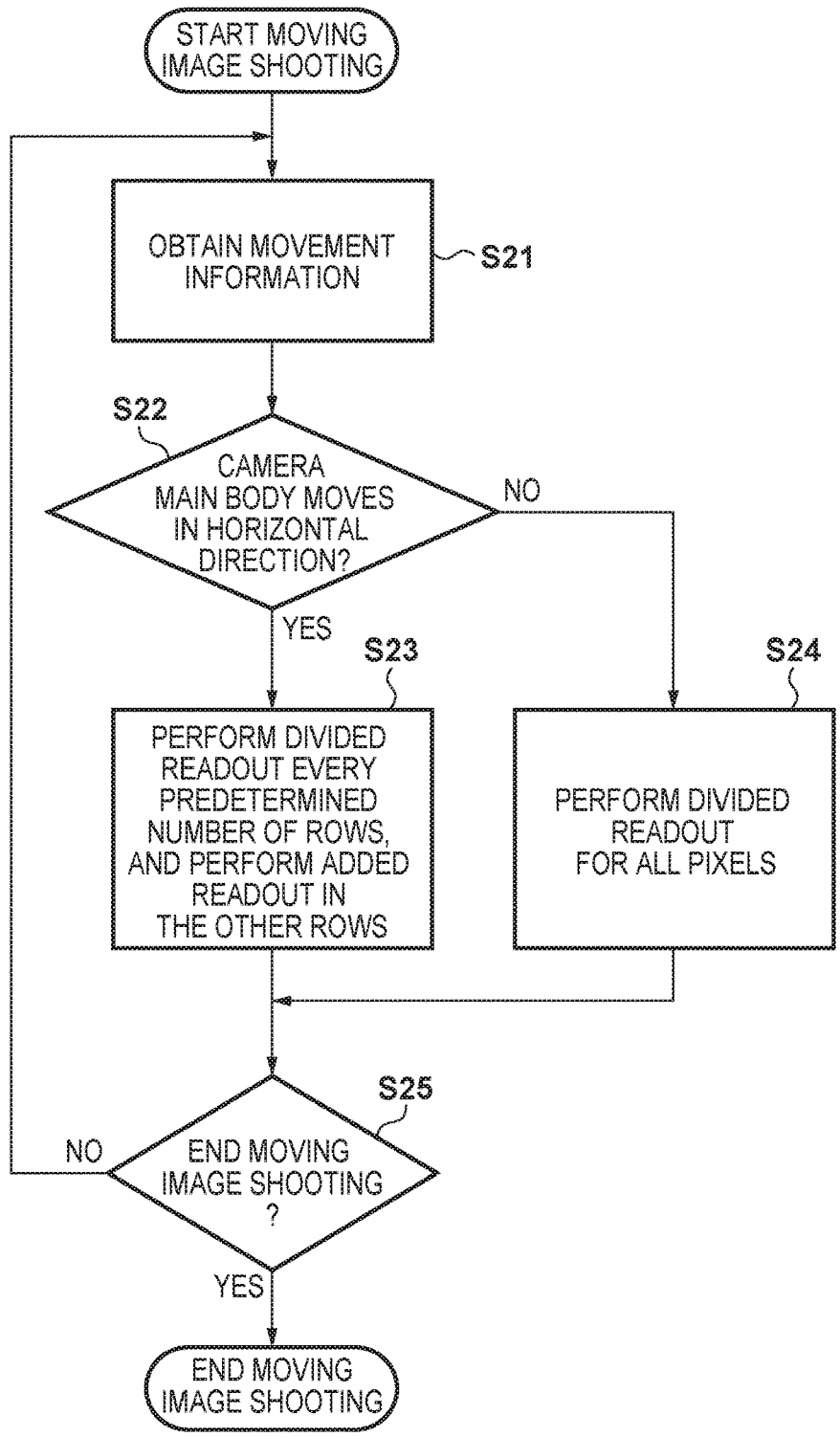
FIG. 8 is a flowchart of a driving method of the image sensor according to the second embodiment.

FIG. 8 a flowchart of the driving method of the image sensor 221 according to the second embodiment. The driving method in the second embodiment can be used especially during moving image shooting and while using electronic view finder in an image capturing apparatus.

When the moving processing starts, first in step S21, the camera control unit 232 obtains the movement information from the camera movement detection unit 701. Then in step S22, whether the camera main body 20' is moving in the horizontal direction is determined. If the camera main body 20' is moving in the horizontal direction, the process proceeds to step S23 where the camera control unit 232 notifies the AF signal readout control unit 233 that the camera main body 20' is moving in the horizontal direction. The AF signal readout control unit 233 controls the image sensor 221 such that the divided readout is performed every predetermined number of rows, and the added readout is performed in the other rows. In this manner, while a signal for recording/display is read out from all the pixels, a pair of AF signals are read out every predetermined number of pixels. At that time, if a subject is detected by the subject detection unit 236, the area where the subject exists may be read out by the divided readout more densely than an area where the subject does not exist.

On the other hand, if the camera main body 20' is not moving in the horizontal direction in step S22, the process proceeds to step S24, where the camera control unit 232 notifies the AF signal readout control unit 233 that the camera main body 20' is not moving in the horizontal direction. In response to this, the AF signal readout control unit 233 controls the image sensor 221 so that the divided readout is performed in all the pixels. In this case, a signal for recording/display and a pair of AF signals are readout from all the pixels.

After step S23 or S24, it is determined in step S25 whether or not the moving image shooting is ended, and if not, the process returns to step S21 and the above described processes are repeated. In a case of ending the moving image shooting (YES in step S25), the processing is ended.

According to the second embodiment as described above, in a case where the camera main body 20' is moving in the horizontal direction, by reducing the number of rows in which the divided readout is performed, it is possible to reduce the number of pixels to be read out by the divided readout without degrading an accuracy of focus detection. By virtue of this, it is possible to reduce the system load and the power consumption.

It should be noted that, in a case where a subject is not moving in the horizontal direction as described in the first embodiment, the moving direction of the camera main body 20' is further determined as described in the second embodiment in order to control the readout method. Conversely, a readout method may be controlled by further determining the moving direction of a subject as described in the first embodiment in a case where the camera main body 20' is not moving in the horizontal direction as described in the second embodiment.

Third Embodiment

Next, a description will be given of a third embodiment of the present invention. The image sensor used in the first embodiment can be selectively read out by the divided readout or the added readout in units of rows, by contrast, in the third embodiment, the image sensor can be controlled to be read out by the divided readout or the added readout also in units of columns.

FIG. 9 shows a configuration of an image sensor 221' according to the third embodiment. The image sensor 221' shown in FIG. 9 differs from the image sensor 221 shown in FIG. 2 in that the image sensor 221' has two horizontal scanning circuits, namely, the first horizontal scanning circuit 208a and the second horizontal scanning circuit 208b. The first horizontal scanning circuit 208a controls the readout circuit 207 such that a signal read out to the readout circuit 207 is sequentially transferred to the output circuit 209. The second horizontal scanning circuit 208b controls the readout circuit 207 such that part of a signal read out to the readout circuit 207 is selectively transferred to the output circuit 209. As the constituents of an image capturing system other than the image sensor 221' are the same as those explained in the first embodiment, the same reference numerals are used and explanation of them are omitted.

Figure 5E:
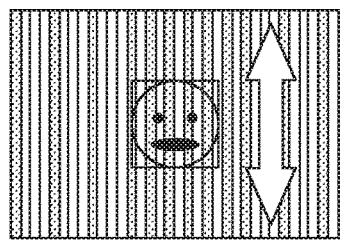

Below, a driving method of the image sensor 221' according to the third embodiment will be explained with reference to a flowchart of FIG. 10 and FIG. 5E. Note that processes in FIG. 10 which are the same as those in FIG. 6 are given the same step numbers, and the explanation of them are omitted appropriately. The driving method in the third embodiment can be also used especially during moving image shooting and while using electronic view finder in an image capturing apparatus.

When the moving image shooting is started, first in step S11, it is determined whether or not a subject is detected in the subject detection unit 236. If no subject is detected, the process proceeds to step S14, and the image sensor 221' is controlled so as to perform the divided readout for all the pixels. In this case, the first horizontal scanning circuit 208a is used to output all signal read out to the readout circuit 207 via the output circuit 209.

In a case where a subject is detected, the process proceeds to step S12, where whether or not the subject is moving in the horizontal direction is determined by comparing in the camera control unit 232 the position of the detected subject with the position/positions of a subject/subjects which have been detected. If it is determined in step S12 that the subject is moving in the horizontal direction, the process proceeds to step S13, where the image sensor 221' is controlled such that the divided readout is performed every predetermined number of rows, and the added readout is performed in the other rows. In this case as well, the first horizontal scanning circuit 208a is used to output all signal read out to the readout circuit 207 via the output circuit 209.

In a case where it is determined in step S12 that the subject is not moving in the horizontal direction, the process proceeds to step S31, where it is determined whether or not the subject is moving in the vertical direction, and if not, the process proceeds to step S14 where the above described process is performed. In a case where the subject is moving in the vertical direction, the process proceeds to step S32 where the camera control unit 232 notifies the AF signal readout control unit 233 that the subject is moving in the vertical direction. The AF signal readout control unit 233 controls the image sensor 221' such that the divided readout is performed every predetermined number of columns, and the added readout is performed in the other columns. In that case, the columns where the subject exists are read out by the divided readout more densely than column where the subject does not exist. In this manner, while a signal for recording/display is read out from all the pixels, a pair of AF signals are read out every predetermined number of columns. FIG. 5E shows an example of readout control in a case where the subject moves in the vertical direction.

In this case, first, an AF signal (A signal or B signal) is read out to the readout circuit 207 from the first PD 203 or the second PD 204 for every row. Then, among the signal readout to the readout circuit 207, the second horizontal scanning circuit 208b selects a signal every predetermined number of columns and the selected signal is output via the output circuit 209. Thereafter, a signal (A+B signal) for recording/display is read out to the readout circuit 207, and the first horizontal scanning circuit 208a controls such that all the signal read out to the readout circuit 207 is output from the output circuit 209.

After the process in step S13, S14 or S32, it is determined in step S15 whether or not the moving image shooting is ended, and if not, the process returns to step S11 and the above described processes are repeated. In a case of ending the moving image shooting (YES in step S15), the processing is ended.

According to the third embodiment as described above, in addition to the same effects as those of the first embodiment, in a case where a subject is moving in the vertical direction, by reducing the number of columns in which the divided readout is performed, it is possible to reduce the number of pixels to be read out by the divided readout without degrading an accuracy of focus detection. By virtue of this, it is possible to reduce the system load and the power consumption.

It should be noted that in FIG. 9, a case where two horizontal scanning circuits for outputting a signal from every column and for outputting a signal from every predetermined number of columns are provided is explained. However, it is possible to use one horizontal scanning circuit capable of selecting columns from which a signal is read.

Fourth Embodiment

Next, a description will be given of a fourth embodiment of the present invention. In the third embodiment as described above, it is explained that, depending on the moving direction of a subject, the divided readout is performed every predetermined number of rows or columns. By contrast, in the fourth embodiment, depending on the moving direction of an image capturing system, it is controlled such that the divided readout is performed every predetermined number of rows or columns.

Note that the image capturing system according to the fourth embodiment can be realized by mounting the image sensor 221' shown in FIG. 9 on the image capturing system shown in FIG. 7, and therefore, the detailed explanation is omitted here.

FIG. 11 a flowchart of the driving method of the image sensor 221' according to the fourth embodiment. Note that processes in FIG. 11 which are the same as those in FIG. 8 are given the same step numbers, and the explanation of them are omitted appropriately. The driving method in the fourth embodiment can be used especially during moving image shooting and while using electronic view finder in an image capturing apparatus.

When the moving processing starts, first in step S21, the camera control unit 232 obtains the movement information from the camera movement detection unit 701. Then in step S22, whether the camera main body 20' is moving in the horizontal direction. If the camera main body 20' is moving in the horizontal direction, the process proceeds to step S23 where the aforesaid process is performed using the first horizontal scanning circuit 208*a*.

On the other hand, if it is determined in step S22 that the camera main body 20' is not moving in the horizontal direction, then the process proceeds to step S41, where it is determined whether the camera main body 20' is moving in the vertical direction. If the camera main body 20' is moving in the vertical direction, then in step S42, the camera control unit 232 informs the AF signal readout control unit 233 that the camera main body 20' is moving in the vertical direction. The AF signal readout control unit 233 controls the image sensor 221' to perform the divided readout every predetermined number of columns, and perform the added readout in the other columns. Note that the control performed in step S42 is the same as the control performed in step S32 in FIG. 10, and the explanation of it is omitted here.

If it is determined in step S41 that the camera main body 20' is not moving in the vertical direction, the process proceeds to step S24, and the AF signal readout control unit 233 control the image sensor 221 to perform the divided readout for all the pixels.

After step S23, S24 or S42, it is determined in step S25 whether or not the moving image shooting is ended, and if not, the process returns to step S21 and the aforesaid processes are repeated. In a case of ending the moving image shooting (YES in step S25), the processing is ended.

According to the fourth embodiment as described above, in addition to the same effects as those of the second embodiment, when the camera main body is moving in the vertical direction, by reducing the number of columns in which the divided readout is performed, it is possible to reduce the number of pixels to be read out by the divided readout without degrading an accuracy of focus detection. By virtue of this, it is possible to reduce the system load and the power consumption.

It should be noted that, in a case where a subject is not moving in the horizontal and vertical directions as described in the third embodiment, the moving direction of the camera main body 20' is further determined as described in the fourth embodiment in order to control the readout method. Conversely, a readout method may be controlled by further determining the moving direction of a subject as described in the third embodiment in a case where the camera main body 20' is not moving in the horizontal and vertical directions as described in the fourth embodiment.

Furthermore, whether or not the subject or the camera main body 20' is moving in the horizontal direction may be determined, and if not, whether or not the subject or the camera main body 20' is moving in the vertical direction may be further determined to control the readout method.

In addition, in the first to fourth embodiments, examples of an image sensor when performing moving image shooting or in the electrical view finder mode are given; however, the present invention can be used in still image shooting while performing sequential image shooting, for example, when keeping focus on a subject.

Furthermore, in the third and fourth embodiments as described above, an explanation is given in a case where the number of rows or columns in which the divided readout is performed is reduced to a predetermined number, but the directions for performing the divided readout may be alternated by field. For example, in the even-number fields, the divided readout is performed every predetermined number of columns, and in the odd-number fields, the divided readout is performed every predetermined number of rows.

Note that, in the above embodiments, cases where the present invention is applied to a digital camera are explained, however, the present invention is not limited thereto. Namely, the present invention is applicable to any devices having an image sensor. More specifically, the present invention is applicable to apparatuses capable of capturing an image, such as cellular phones, portable image viewers, television sets with cameras, digital photo frames, music players, game machines, electronic book readers, and so forth.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110797, filed on May 29, 2015 which is hereby incorporated by reference herein in its entirety.

What is claimed is:

1. An image capturing apparatus comprising:
    an image sensor that has a plurality of pixels, arranged in two dimensions, each having a plurality of photoelectric conversion portions and a microlens, and outputs an image signal corresponding to a quantity of incident light; and
    at least one processor or one circuitry which functions as
    a detection unit that detects a moving direction of a subject based on the image signal;
    a determination unit that, in a case where the moving direction of the subject detected by the detection unit is a main scanning direction, determines to perform first readout in which a pair of signals having parallax and an added signal of the plurality of photoelectric conversion portions are obtained from each pixel in every predetermined number of rows, and to perform second readout in which an added signal of the plurality of photoelectric conversion portions corresponding to each microlens is obtained from each pixel in the rows except for the every predetermined number of rows; and
    a control unit that controls the image sensor by switching between the first readout and the second readout in units of rows based on a determination result of the determination unit.

2. The image capturing apparatus according to claim 1, wherein the determination unit determines to readout more rows by the first readout from rows corresponding to an area where the subject whose moving direction is the main scanning direction is detected than other rows.

3. The image capturing apparatus according to claim 1, wherein the determination unit determines to perform the first readout in all the rows in a case where the moving direction of the subject is not the main scanning direction.

4. A control method of an image sensor that has a plurality of pixels, arranged in two dimensions, each having a plurality of photoelectric conversion portions and a microlens, and outputs an image signal corresponding to a quantity of incident light, the method comprising:
    detecting a moving direction of a subject based on the image signal;
    determining, in a case where the detected moving direction of the subject is a main scanning direction, to perform first readout in which a pair of signals having parallax and an added signal of the plurality of photoelectric conversion portions are obtained from each pixel in every predetermined number of rows, and to perform second readout in which an added signal of the plurality of photoelectric conversion portions corresponding to each microlens is obtained from each pixel in the rows except for the every predetermined number of rows; and controlling the image sensor by switching between the first readout and the second readout in units of rows based on a result of the determination.

* * * * *